Figure 1:
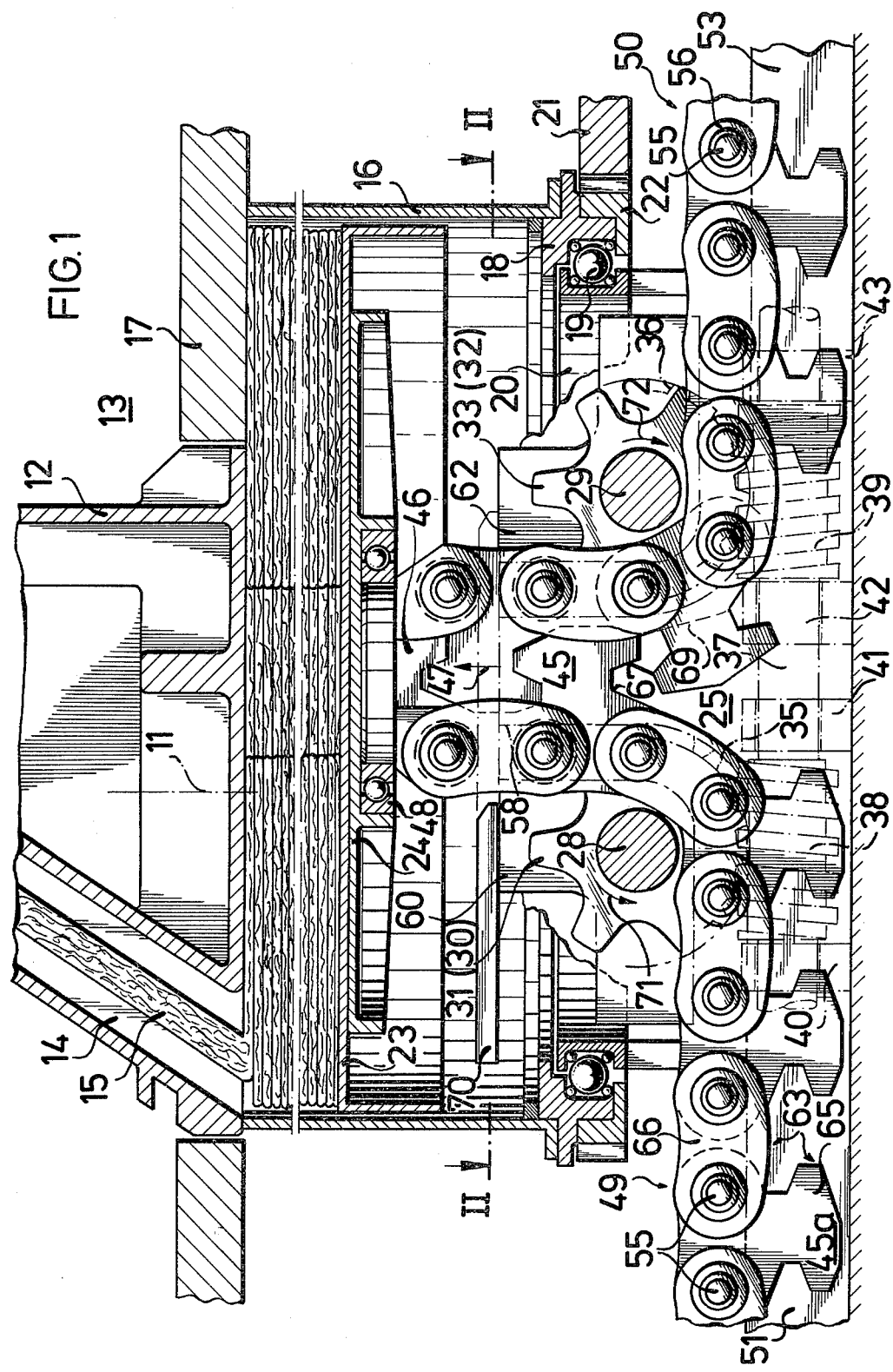

United States Patent [19]

Schmid

[11] 4,210,031
[45] Jul. 1, 1980

[54] LIFTING OR PRESSING DEVICE

[75] Inventor: Reinhold Schmid, Mönchen-Gladbach, Fed. Rep. of Germany

[73] Assignee: W. Schlafhorst & Co., Mönchen-Gladbach, Fed. Rep. of Germany

[21] Appl. No.: 884,117

[22] Filed: Mar. 7, 1978

[30] Foreign Application Priority Data

Mar. 9, 1977 [DE] Fed. Rep. of Germany ....... 2710194

[51] Int. Cl.² ............................................. F16G 13/02
[52] U.S. Cl. ................................. 74/89.21; 474/156
[58] Field of Search .......... 74/243 C, 243 H, 243 FC, 74/245 C, 245 R, 245 LP, 248, 250 R, 250 C; 175/113; 226/170, 171, 172 E

[56] References Cited

U.S. PATENT DOCUMENTS

| 169,642 | 11/1875 | Howard | 226/172 |
| 2,690,591 | 10/1954 | Wallace | 74/243 C |
| 3,742,775 | 7/1973 | Hayes | 74/245 R |
| 4,142,596 | 3/1979 | Dressel et al. | 74/245 C |

Primary Examiner—Samuel Scott
Assistant Examiner—G. Anderson
Attorney, Agent, or Firm—Herbert L. Lerner

[57] ABSTRACT

Lifting or pressing device includes means for transmitting thrust, and a compressive force-transmitting push rod shiftable by said thrust transmitting means, the push rod being formed of individual elements form-lockingly clampable one to another, the individual elements being fittable with a pressure-proof, bending-proof and buckling-proof fit into one another in direction of thrust by the thrust transmitting means, and being releasable in a direction opposite the direction of thrust and being divertable out of the direction of thrust.

8 Claims, 2 Drawing Figures

LIFTING OR PRESSING DEVICE

The invention relates to a lifting or pressing device, especially for the shiftable or displaceable base of a sliver can for spinning machines with a compressive force-transmitting push rod shiftable by a shove transmission or drive. When filling such sliver cans at a drawing or stretching mechanism or unit of a spinning machine, an effort is made to accommodate the largest possible quantity of sliver in the individual can. For this purpose, the base of the sliver can is made shiftable or displaceable and, at the beginning of the sliver-filling operation, is initially shoved upwardly by a push rod driven by a thrust transmission. With increasing sliver-filling, the base sinks downwardly so that the filling operation is able to proceed only under a predetermined compressive force. The sliver with which the can is filled is thereby compressed from the start so that, at the end of the sliver-filling operation, when the base has reached the lower end of the sliver can, the content thereof is very tightly packed.

Since it is necessary to raise the base of the sliver can a considerable distance, initially, and then to lower it again the same distance, so much space must be provided underneath the sliver-filling station of the drawing mechanism that a thrust transmission or drive and a long push rod can be disposed thereat. Since the sliver cans in the sliver-filling station are already disposed at floor level, space must thus be provided under the floor.

Efforts have been made heretofore to reduce the structural height of the lifting or pressing device by providing a pantograph linkage. Such a construction has kinematic disadvantages, however, since large bearing forces must be applied, when stretching or extending the pantograph, because of the unfavorable deflecting angle. Moreover, controlling the compressive force in dependence upon the location of the joints is necessary if the base of the sliver can is to be pressed upwardly with constant pressure. The structural height can be spared by providing a system of telescopic tubes and transmitting the compressive forces through a fluid. In this regard, auxiliary pneumatic or hydraulic devices must be provided. In both cases, a rather large minimal spacing is required between the thrust transmission and the base of the sliver can for disposing therein the pantograph scissors or the telescoped telescopic tubes.

It is accordingly an object of the invention to provide a lifting or pressing device with a compressive force transmitting by a push rod.

No structural height at all is called for theoretically in direction of thrust or lift, in the starting position.

To lift the base of a sliver can, only so much structural height is thus necessary between the thrust transmission and the base as is required by the possible subsequent disposition therein of a pressure plate.

With the foregoing and other objects in view, there is provided, in accordance with the invention, a lifting or pressing device comprising means for transmitting thrust, and a compressive force-transmitting push rod shiftable by the thrust transmitting means, the push rod being formed of individual elements form-lockingly clampable one to another, the individual elements being fittable with a pressure-proof, bending-proof and buckling-proof fit into one another in direction of thrust by the thrust transmitting means, and being releasable in a direction opposite the direction of thrust and being divertable out of the direction of thrust. In the lifting device according to the invention, no push rod is provided at all any longer below the thrust transmission and beyond or outside the direction of thrust. Individual elements are fed to the thrust transmission and only in and due to the latter are joined together to form a pressure-proof, bending-proof and buckling-proof push rod. The instant the thrust transmission is switched-over to reverse operation, the push rod breaks up again into the individual elements thereof. Between the thrust transmission and the application point of the compressive forces, for example the pressure plate disposed at the end of the push rod, the push rod is always maintained at a length that is variably adjustable by the thrust transmission as a pressure-proof, bending-proof and buckling-proof structure.

Advantageously, the individual elements are articulatingly connected to one another into an even number of chains. In accordance with a specific feature of the invention, therefore, the individual elements are connected articulatingly to one another into at least two chains.

Further, in accordance with another feature of the invention, respective pairs of chains feedable from different directions are divertable by the thrust transmitting means in the direction of thrust, the chains having clamping members alternatingly clampable one to the other for fitting the individual elements into one another. This joining and separation of these chains provided with clamping members occurs in accordance with the slide-fastener principle.

In accordance with an added feature of the invention, the clamping members, after they have been diverted into the thrust direction, form a toothing.

So that such a toothing has no opportunity to open sidewards, in accordance with a concomitant feature of the invention, provision is made that the individual elements of the chains have at least part of an outer strap covering the respective clamping members.

When the outer strap of the one chain partly covers the clamping member fastened to the other chain, both chains can no longer deviate sidewise after leaving the thrust transmission.

In accordance with yet another feature of the invention, the individual elements of the chains have articulating connections like that of a roller chain, the thrust transmission having at least two sprocket wheels aligned one with the other and rotatable in synchronism in opposite rotary directions. The chains can advantageously be duplex chains, the thrust transmission accordingly having two pairs of sprocket wheels. Duplex chains have common articulating pins and are therefore especially stable and sturdy. Naturally, more than two roller chains can also be connected to one another through common articulating pins.

The sprocket wheels are advantageously relieved of lateral forces of the push rod. For this purpose, closely tolerant wear-resistant guide elements for the push rod are disposed at the outlet or output of the thrust transmission. In this manner, the newly formed push rod received bracing or support from all sides already at the outlet or output from the thrust transmission.

A low structural height of the entire device is attained, if the individual elements or chains are feedable into the thrust transmission transversely to the direction of thrust or lift. A feed at an angle substantially equal to 90° to the direction of thrust or lift is advantageous.

The individual elements of the chains can be fed from magazines into the thrust transmission. In the simplest situation, such magazines are formed of straight sleeves or shells with or without feed springs. The magazines can also be constructed as drum magazines or meander magazines. the type of magazines depends entirely upon the local available space conditions at the installation or assembly location.

An especially good guidance of the roller chains is attained, in accordance with the invention, if the chain pins of the articulating connections are elongated and have special guide rollers at the ends thereof. Outside or beyond the thrust transmission, the chains can be mounted on rails by means of these guide rollers. Within the thrust transmission, guidance can be taken over by guide elements or guide surfaces engaging the guide rollers. At least part of the compressive force can be transmitted through the guide rollers to the guide surfaces so that relief of the sprocket wheels exists in stationary operation.

In accordance with yet another feature of the invention, inner straps of the chains are constructed as the clamping members. It is thus unnecessary to provide special clamping members. The disposition of special clamping members, which can be located, for example, between the inner straps of the roller chains, is not prohibited or blocked, however. Advantageously, pressure members mutually engageable alternatingly in thrust direction are disposed between the inner straps of the chains that are constructed as clamping members. These pressure members can be simultaneously constructed as clamping and have a toothing, however, this is not necessary. It is sufficient if the pressure members alternatingly disposed at the chains at the left and right-hand sides are so joined to one another by the thrust transmission that a column loadable in compression is produced which is disposed between the inner straps of the chains.

In many applications, a constant compressive force is required. For this purpose, it is advantageous for the thrust transmission to have a drive motor with torque limitation. Such a drive motor can consist of a short circuit-proff electric motor suited for continuous operation. In switched-on condition, the electric motor exerts, during shutdown, a quite specific torque, so that a quite specific thrusting or lifting force is adjusted or set at the push rod.

Instances of use are conceivable wherein the push rod is supposed to remain in a specific position or setting for a very long time. In such a case, it is advantageous to provide a clamping or latching device for the push rod. Such a device can, for example, latch the push rod to the thrust transmission or the housing of the latter so that the sprocket wheels or drive elements of the thrust transmission are pressure-relieved.

Advantages attained with the invention of the instant application are especially that under confined spatial conditions, a pressure-proof or bending-resistant and buckling-proof or buckling-resistant push rod of considerable length can be formed, subjected to load and also again relieved of loading and removed. The lifting or pressing device according to the invention can, for example, be furnished at drawing mechanisms or units previously installed at sliver-fitting stations for filling sliver cans for spinning machines.

Other features which are considered as characteristic for the invention are set forth in the appended claims.

Although the invention is illustrated and described herein as embodied in a lifting or pressing device, it is nevertheless not intended to be limited to the details shown, since various modifications and structural changes may be made therein without departing from the spirit of the invention and within the scope and range of equivalents of the claims.

Figure 2:
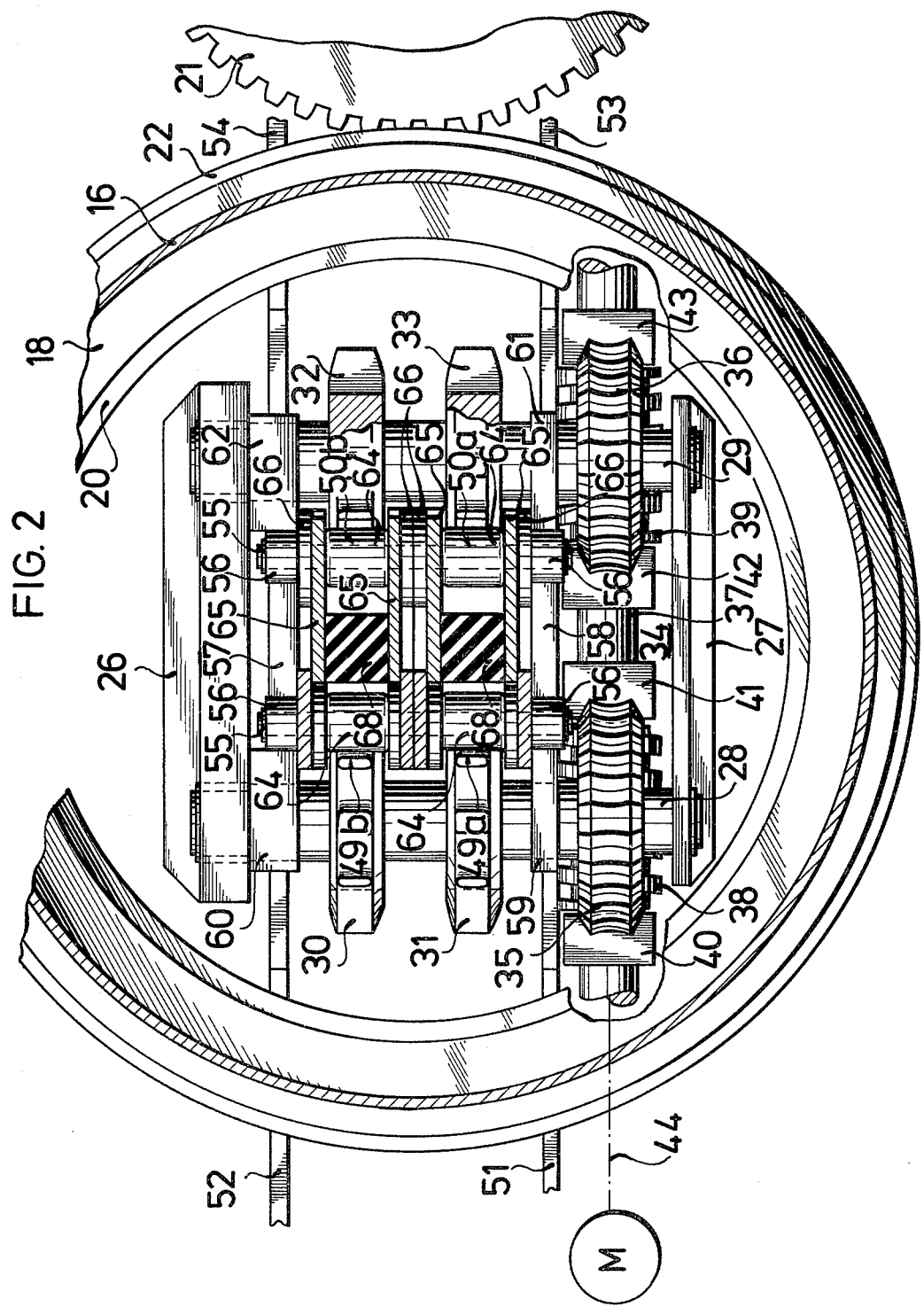

The construction and method of operation of the invention, however, together with additional objects and advantages thereof will be best understood from the following description of specific embodiments when read in connection with the accompanying drawings, in which:

FIG. 1 is a side elevational, partly sectional view of a lifting and pressing device according to the invention; and FIG. 2 is a cross-sectional view of FIG. 1 taken along the line II—II in direction of the arrows.

Referring now to the drawing and first, particularly, to FIG. 1 thereof, there is shown a rotatable funnel or hopper wheel 12 of a drawing or stretching mechanism or frame 13. Other parts of the drawing mechanism 13 are not illustrated as they would be superfluous to an understanding of the invention of the instant application. Through a funnel 14 of the funnel wheel 12, a fiber sliver 15 is placed into a sliver can 16 disposed below the funnel wheel 12. The funnel wheel 12 rotates in a circular opening formed in a plate 17. The sliver can 16 is disposed on a rotary plate or turntable 18 which is braced through a ball bearing 19 against a stationary ring mount 20. The turntable 18 provided with a ring gear 22 by which it is rotated through a gear 21 driven by a non-illustrated driving device of the drawing mechanism 13. The rotary motions of the funnel wheel 12 and the turntable 18 are coordinated or balanced relative to one another so that the funnel wheel 12 rotates about 25 times more rapidly than does the turntable 18. As a result of these mutually coodinated movements, the sliver 15 is cycloidally introduced into the sliver can 16.

The sliver can 16 has a movably mounted base 23 supported from below by a pressure plate 24. A lifting or pressing device 25 is disposed below the pressure plate 24. Since FIG. 2 is a cross-sectional view of FIG. 1 taken along the line II—II in direction of the arrows, most of the parts of the lifting or pressing device 25 are visible therein. Thus, two stationary bearing blocks 26 and 27, wherein two shafts 28 and 29 are supported, are clearly seen in FIG. 2. The shaft 28 carries sprocket wheels 30 and 31, and the shaft 29 sprocket wheels 32 and 33. The shafts 28 and 29 are driven through a worm gearing or transmission indicated generally as 34. Worm gears 35 and 36 fastened to the shafts 28 and 29, respectively, as well as worms 38 and 39 mounted on a common shaft 37 belong to this worm transmission 34. In the side elevational view of FIG. 1, the worm transmission 34 has been disassembled and removed, and the location of the component parts thereof is therefore indicated only in phantom. The shaft 37 of the worm transmission 34 is stationarily mounted in bearing blocks 40 to 43 and is connected through a diagrammatically represented operative connection 44 to a motor M constructed as a short circuit-proff electric motor. The parts 26 to 43 form a thrust transmission 45, with the aid of which, a push rod 46 is shiftable in direction of the arrow 47. At the end of the push rod 46, a ball bearing 48 is mounted which effects the connection of the push rod 46 to the pressure plate 24. Through the ball bearing 48, assurance is provided that, in fact, the pressure plate 24 can follow the rotation of the base 23 and of the sliver can 16, while the end of the push rod 46, however, is not required to perform any rotary movement.

It is apparent from FIGS. 1 and 2 that a duplex chain 49 is delivered to the sprocket wheel 30 and 31 and is constructed as a roller chain. A similar duplex chain 50 is fed from the opposite side to the sprocket wheels 32 and 33. The duplex chain 49 is formed of chains 49a and 49b, and the duplex chain 50 of chains 50a and 50b.

The duplex chain 49 is fed on rails 51 and 52, and the duplex chain 50 on rails 53 and 54 to the thrust transmission 45. The individual chains of the duplex chains 49 and 50 are held together by similar chain pins 55 which carry guide rollers 56 at the ends thereof. The guide rollers 56 serve as guidance for the chains on the respective rails 51 to 54 as well as for guiding the chains within the thrust transmission 45. In vicinity of the thrust transmission 45, guide members 57 and 58 are provided, which are disposed between both duplex chains 49 and 50 and serve as guidance for both chains. Also provided are guide members 59 and 60 which only serve as guidance for the duplex chain 49, and guide members 61 and 62 only serving as guidance for the duplex chain 50. In FIG. 1, the guide members 59 and 61 have been removed. The location of the guide member 58, furthermore, is indicated only in phantom in FIG. 1.

All of the individual chains of the duplex chains 49 and 50 are formed of similar individual elements 63. Each of those individual elements 63 is made up of two chain pins 55 (shared in common by the adjacent chain), two rollers 64 strung on the chain pins 55 and disposed one behind the other in direction of movement thereof, two inner straps 65 disposed pairwise opposite one another and two outer straps 66 disposed pairwise opposite one another. The inner straps 65 are constructed as clamping members and, for the purpose, having a toothing 67 of such form that the straps of opposite chains, after being diverted or deflected 90° in direction of the arrow 47, engage one another in an exact fit and, in this manner, mesh with one another.

It is apparent from FIG. 2 that, between the inner straps 65 of each chain, pressure elements 68 are disposed. The pressure elements 68 have the same contour and shape as those of the inner straps 65, but extend, however, only to the broken line 69 shown in FIG. 1. It is clear from FIG. 2 that the pressure elements 68 maintain a specific spacing or clearance from the rollers 64. They consequently do not hinder the operability of the sprocket wheels 31 to 33. The pressure elements 68 take up, during operation, a considerable part of the entire compressive force or thrust.

As shown in FIG. 1, a latch 70 is provided which can be shifted or slid between the rollers 64. The latch 70 is fork-shaped so that it can be slid simultaneously between the individual chains of the duplex chains 49 and 50.

FIG. 1 shows the final phase of the operation wherein the sliver can 16 is filled with sliver 15. At the beginning of such a filling operation, the shafts 28 and 29 are rotated in mutually opposite rotary sense and, in fact, the shaft 28 in direction of the arrow 71, and the shaft 29 in direction of the arrow 72. The individual elements of the chains fed in upon the rails 51 to 54, after being diverted through 90°, are joined together with the push rod 46 which can attain a considerable length without losing the required compressive strength, bending strength and buckling strength thereof. Since the drive motor M has a given short-circuit torque, the compressive force or thrust is limited to a specific value.

With this predetermined compressive force or thrust, the pressure plate 24 and the base 23 therewith are thrust or pressure upwardly. The sliver 15 is being introduced from above through the funnel wheel 12 into the sliver can 16, a corresponding opposing force being accordingly exerted thereon. Under the effect of this opposing or counter pressure, the base 23 is shoved downwardly, with shortening of the push rod 46, until the sliver can 16 is completely filled. In the interim, the driver motor M, subjected to short-circuit current, rotates backwards. After the filling process has ended, the drive motor M is switched off and the sliver can is lifted from the turntable 18. After setting a new, empty sliver can upon the turntable 18, the filling process is repeated.

Instead of the chain-like connected individual elements, unconnected individual elements are also conceivable, which can be connected to a push rod through the thrust transmission in exactly the same manner. The feed must then, advantageously, occur through a magazine or storage container under spring pressure. The mutual intercoupling of the individual elements into chains has been found, however, to be advantageous. Storing in magazines or "magazining" is not necessary in this case, it being sufficient to provide a storage at ground level on rails as shown in the figures of the drawing. If it is necessary after the push rod 46 has traveled upwardly, the latch 70 can be inserted above the guide elements 57 to 62. The chain links are then braced upon this latch 70, and the sprocket wheels can be relieved. In the illustrated and hereinaforedescribed embodiment of the invention, the provision of a latching and braking device is not absolutely necessary, however,.

As noted hereinbefore, the invention is obviously not limited to the illustrated and described embodiment. Quite different possible applications of the invention are conceivable. For example, scaffolding, tables, working platforms, pedestals or the like can be lifted up. In this regard, a plurality of thrust transmissions or drives and push rods can be set into operation. A synchronized rotary motion of a plurality of thrust transmissions can also be provided.

If the rquired length of the push rod is very great, the chains are advantageously held available in drum magazines or meander magazines. The magazines can be disposed at some distance away from the working location. For general uses, it is sufficient, however, to feed the chains flatly over the ground to the thrust transmission.

The type of clamping or toothing has been represented only by way of example, although the illustrated toothing is indeed practical and advantageous.

There are claimed:

1. Lifting or pressing device comprising means for transmitting thrust, and a compressive force-transmitting radially stationary push rod shiftable by said thrust transmitting means, said push rod being formed of individual elements form-lockingly clampable one to another, said individual elements being fittable with a pressure-proof, bending-proof and buckling-proof fit into one another in direction of thrust by said thrust transmitting means, and being releasable only in a direction opposite the direction of thrust and being divertable out of the direction of thrust, said individual elements being connected articulatingly to one another into at least two chains, respectively, two chains feedable from different directions being divertable by said thrust transmitting means into the direction of thrust, said chains having clamping members alternatingly clampable one to the other for fitting said individual elements into one another, said individual elements of said chains having at least part of an outer strap covering the respective clamping members.

2. Lifting or pressing device according to claim 1 wherein said clamping members is diverted condition thereof in said thrust direction form a toothing.

3. Lifting or pressing device according to claim 1 wherein said individual elements of said chains have articulating connections.

4. Lifting or pressing device according to claim 1 including means for feeding said individual elements of said chains substantially 90° to said direction of thrust.

5. Lifting or pressing device according to claim 1 wherein said individual elements of said chains have articulating connections including chain pins extending therethrough and having respective elongated ends, and guide rollers respectively mounted on said elongated ends of said chains pins.

6. Lifting or pressing device according to claim 1, wherein said clamping members are in the form of inner straps of said chains.

7. Lifting or pressing device according to claim 9 including pressure members mutually engageable alternatingly in thrust direction disposed between said inner straps of said chains.

8. Lifting or pressing device according to claim 1 including latching means selectively engageable with said push rod for locking said push rod in position.

* * * * *